US012534588B2

(12) United States Patent
Ou et al.

(10) Patent No.: US 12,534,588 B2
(45) Date of Patent: Jan. 27, 2026

(54) MULTI-BLOCK COPOLYESTER ETHER THERMOPLASTIC ELASTOMER FOAM, PREPARATION METHOD THEREOF, AND SPORTS SHOE MIDSOLE MADE FROM THE SAME

(71) Applicant: FAR EASTERN NEW CENTURY CORPORATION, Taipei (TW)

(72) Inventors: Fu-Wen Ou, Taoyuan (TW); Ming-Champ Lin, Taoyuan (TW); Jia-Ying Wu, Taoyuan (TW)

(73) Assignee: FAR EASTERN NEW CENTURY CORPORATION, Taipei (TW)

(*) Notice: Subject to any disclaimer, the term of this patent is extended or adjusted under 35 U.S.C. 154(b) by 874 days.

(21) Appl. No.: 17/859,567

(22) Filed: Jul. 7, 2022

(65) Prior Publication Data

US 2023/0151178 A1 May 18, 2023

(30) Foreign Application Priority Data

Nov. 16, 2021 (TW) ................. 110142657

(51) Int. Cl.
| | |
|---|---|
| *C08J 9/00* | (2006.01) |
| *A43B 13/12* | (2006.01) |
| *A43B 13/18* | (2006.01) |
| *C08J 9/228* | (2006.01) |

(52) U.S. Cl.
CPC ............ *C08J 9/228* (2013.01); *A43B 13/125* (2013.01); *A43B 13/187* (2013.01); *C08J 9/0066* (2013.01); *C08J 2205/052* (2013.01); *C08J 2367/02* (2013.01)

(58) Field of Classification Search
CPC ... C08G 63/183; C08G 63/672; Y02W 30/62; C08J 9/228; C08J 2205/052; C08J 2367/02; A43B 13/125; A43B 13/187

USPC ................................... 521/48.5, 182
See application file for complete search history.

(56) References Cited

U.S. PATENT DOCUMENTS

| | | | |
|---|---|---|---|
| 4,984,376 A | 1/1991 | Walter et al. | |
| 4,988,740 A * | 1/1991 | Walter ........................ | C08J 9/06 |
| | | | 525/437 |
| 7,795,320 B2 | 9/2010 | Determan et al. | |
| 7,902,263 B2 * | 3/2011 | Agarwal .............. | C08G 63/183 |
| | | | 528/480 |
| 9,234,076 B2 | 1/2016 | Ou et al. | |
| 10,829,607 B2 | 11/2020 | Kondo et al. | |
| 2008/0039540 A1 | 2/2008 | Reitz et al. | |
| 2020/0087476 A1 | 3/2020 | Chang et al. | |

FOREIGN PATENT DOCUMENTS

| | | |
|---|---|---|
| CN | 105001405 A | 10/2015 |
| CN | 110536620 A | 12/2019 |
| TW | 154470 B | 3/1991 |
| TW | I637008 B | 10/2018 |
| TW | I637008 B | 10/2018 |
| TW | 201902666 A | 1/2019 |

* cited by examiner

*Primary Examiner* — Fred M Teskin
(74) *Attorney, Agent, or Firm* — Lippes Mathias LLP

(57) ABSTRACT

Disclosed is a multi-block copolyester ether thermoplastic elastomer foam prepared from an aromatic polyester compound and contains a short-chain structure, a long-chain structure and a residual functional group of a chain extender. The short-chain structure has both an aromatic dicarboxylic acid ethylene glycol ester block structure and an aromatic dicarboxylic acid butylene glycol ester block structure. The long-chain structure has a polyether diol block structure. Based on 100 parts by weight of the multi-block copolyester ether thermoplastic elastomer foam, a content of the polyether diol block structure is 45 parts by weight to 65 parts by weight. The multi-block copolyester ether thermoplastic elastomer foam has a melting point not higher than 170° C. and a melt flow index less than 20 g/10 min.

24 Claims, 7 Drawing Sheets

MULTI-BLOCK COPOLYESTER ETHER THERMOPLASTIC ELASTOMER FOAM, PREPARATION METHOD THEREOF, AND SPORTS SHOE MIDSOLE MADE FROM THE SAME

CROSS-REFERENCE TO RELATED APPLICATION

This application claims priority to Taiwan Application Serial Number 110142657, filed Nov. 16, 2021, which is herein incorporated by reference.

BACKGROUND

Field of Invention

The present disclosure relates to a multi-block copolyester ether thermoplastic elastomer foam, a preparation method thereof, and a sports shoe midsole made from the same.

Description of Related Art

In general, the conditions of an ideal sports shoe include the advantages of lightweight, low shock-absorbing and cushioning value (g value), low permanent compression set value (rate), and high rebound rate. The lower the shock-absorbing and cushioning value, the better the shock-absorbing and cushioning performance of the shoe midsole, and the higher the rebound rate, the better the energy return of the shoe midsole. In other words, the higher the rebound rate of an ideal shoe midsole, the better; and the lower the g value of the shoe midsole, the better. However, most sports shoe midsole cannot both satisfy the performance of shock-absorbing and cushioning and the rebound rate at the same time in general. Therefore, most highly elastic midsole materials (rebound rate >50%) cannot meet the required shock-absorbing and cushioning performance (the recommended g value of sports shoe midsole ranges from 9 to 15). In addition, the shoe midsole material must have a certain hardness to provide better support and anti-wear ability for the sole. However, if the hardness of the shoe midsole material is too high, the shock-absorbing and cushioning value of the shoe material will be unacceptable. At present, most commercially available midsole materials used in sports shoes are ethylene-vinyl acetate (EVA), EVA/polyethylene (PE), thermoplastic polyurethane (TPU) foam materials, etc. However, the above materials have at least the following disadvantages: (1) The density of EVA foam materials is high (generally between 0.2 g/cm$^3$ to 0.3 g/cm$^3$), the permanent compression set value (rate) is high (generally greater than 50%), and the rebound rate is low (the rebound rate of EVA foam materials and their mixtures is generally about 30%). (2) The density of TPU foam material is high, such that the sports shoe midsole made of TPU foam material is heavy in weight and high in hardness, it causes insufficient shock absorption performance of sports shoes.

Therefore, a foam material that can meet the requirements of sports shoes for lightweight, low permanent compression set value (rate), and high rebound rate is currently needed as a midsole material for sports shoes. In addition, a foam material that can meet the chemical foaming and mixing process and equipment currently used in the footwear industry, such as Banbury mixer and chemical foaming molding process, is currently needed.

In terms of material characteristics, the thermoplastic polyether ester elastomer (TPEE) with soft and hard segments is prepared into the sports shoe midsole through foam molding, which can meet the requirements of sports shoes for lightweight, low permanent deformation rate, and high rebound rate, and hence is a suitable material for the sports shoe midsole. By regulating the crystallinity of the hard segment of the TPEE main segment and the flexibility and mobility of the TPEE soft segment to achieve a balance, TPEE can provide excellent elasticity in the sports shoe midsole, and at the same time provide good hardness.

U.S. Pat. No. 7,795,320B2 patent discloses that a copolyester ether with a random structure is prepared through depolymerization of recycled PET by diols, which is significantly different from the preparation of multi-block copolyester ether thermoplastic elastomers of the present disclosure. In terms of material characteristics, U.S. Pat. No. 7,795,320B2 emphasizes that the tensile modulus value of its material is in a range from 20 MPa to 1200 MPa, and this technical requirement is significantly different from the technical requirement of the foamed elastomer which is being applied to the sports shoe midsole for low permanent deformation rate and high rebound rate.

TW154470B patent discloses a sports shoe midsole, in which the midsole includes a thermoplastic multi-block copolymer elastomer, and the multi-block copolymer elastomer is made by reacting a low molecular weight diol with an aromatic dicarboxylic acid by a conventional polymerization method, which is distinctly different from the present disclosure which uses diol depolymerization to form a multi-block copolyester ether thermoplastic elastomer.

TWI637008B patent discloses an ester-based elastomer foam molded article, and the short-chain segment of the ester-based elastomer is polybutylene terephthalate, which is significantly different from the short-chain segment structure of the present disclosure. Also, the foaming system of TWI637008B is a fusion body formed by the fusion of a plurality of foamed particles, which is entirely different from the structure of the elastomer foam of the present disclosure.

US20200087476A1 patent discloses a method of manufacturing a thermoplastic elastomer foam, in which the elastomer is a polyester copolymer blended with nylon or an ethylene-vinyl alcohol copolymer, and such a structure of the elastomer is completely different from the present disclosure.

SUMMARY

The present disclosure provides a multi-block copolyester ether thermoplastic elastomer foam, which can be used as a midsole component for shoes. It is worth noting that, verified by experimental data, the copolyester ether in the multi-block copolyester ether thermoplastic elastomer foam of the present disclosure is a block structure instead of a random structure which is generally prepared by a conventional polymerization method. Therefore, it can be seen that there is a clear difference between the copolyester ether of the present disclosure and the copolyester ether prepared by the conventional polymerization method.

The multi-block copolyester ether thermoplastic elastomer foam provided by the present disclosure is prepared from an aromatic polyester compound and includes a short-chain structure, a long-chain structure and a residual functional group of a chain extender. The short-chain structure has both an aromatic dicarboxylic acid ethylene glycol ester block structure and an aromatic dicarboxylic acid butylene glycol ester block structure. The long-chain structure has a polyether diol block structure. Based on 100 parts by weight of the multi-block copolyester ether thermoplastic elastomer foam, a content of the polyether diol block structure is 45 parts by weight to 65 parts by weight. The multi-block copolyester ether thermoplastic elastomer foam has a melting point not higher than 170° C. and a melt flow index less than 20 g/10 min.

In some embodiments, the aromatic dicarboxylic acid ethylene glycol ester block structure and the aromatic dicarboxylic acid butylene glycol ester block structure are formed by a depolymerization or partial depolymerization reaction of the aromatic polyester compound.

In some embodiments, the aromatic dicarboxylic acid ethylene glycol ester block structure and the aromatic dicarboxylic acid butylene glycol ester block structure formed by the depolymerization or partial depolymerization reaction of the aromatic polyester compound includes p-phenylene, m-phenylene, or a combination thereof.

In some embodiments, the short-chain structure further includes a block structure formed by an esterification reaction of a C2 to C6 aliphatic dicarboxylic acid and a C2 to C4 diol.

In some embodiments, the C2 to C6 aliphatic dicarboxylic acid includes glutaric acid, adipic acid, lactic acid, or a combination thereof.

In some embodiments, the C2 to C4 diol includes ethylene glycol, butanediol, or a combination thereof.

In some embodiments, the polyether diol block structure is formed by a reaction of polytetramethylene ether glycol and a depolymerized reaction product, which is formed by a depolymerization or partial depolymerization reaction of the aromatic polyester compound, in which a weight average molecular weight of the polytetramethylene ether glycol ranges from 650 g/mole to 4000 g/mole.

In some embodiments, the polyether diol block structure further includes a block structure formed by an esterification reaction of a C2 to C6 aliphatic dicarboxylic acid and a polytetramethylene ether glycol.

In some embodiments, the residual functional group of the chain extender includes epoxy group, isocyanate group, methylol group, imino group, or a combination thereof.

In some embodiments, the multi-block copolyester ether thermoplastic elastomer foam further includes a sulfonic acid group residue, in which the sulfonic acid group residue is selected from the group consisting of 5-sulfoisophthalic acid, 5-sulfoisophthalic acid sodium salt, and a combination thereof.

In some embodiments, the aromatic polyester compound has a divalent group as follows:

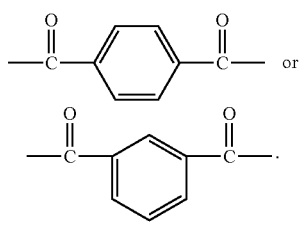

The present disclosure further provides a multi-block copolyester ether thermoplastic elastomer foam which includes the following (a) to (k):

(a) an aromatic dicarboxylic acid ethylene glycol ester block structure having a general formula represented by formula (1):

formula (1)

in which R is a divalent group formed by a depolymerization or partial depolymerization reaction of an aromatic polyester compound as follows:

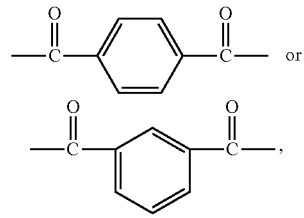

in which G is $—C_2H_4—$;

(b) an aromatic dicarboxylic acid butylene glycol ester block structure having a general formula represented by formula (2):

formula (2)

in which R is as defined above, and G' is $—C_4H_8—$;

(c) an aliphatic dicarboxylic acid ethylene glycol ester block structure having a general formula represented by formula (3):

formula (3)

in which R' is a C2 to C6 divalent aliphatic functional group, and G is as defined above;

(d) an aliphatic dicarboxylic acid butylene glycol ester block structure having a general formula represented by formula (4):

formula (4)

in which R' and G' are as defined above;

(e) a polyester ether block structure having a general formula represented by formula (5):

formula (5)

in which R" is a C2 to C6 divalent aliphatic functional group or a divalent group formed by a depolymerization or partial depolymerization reaction of the aromatic polyester compound as follows:

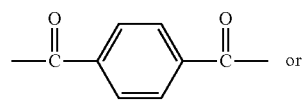

-continued

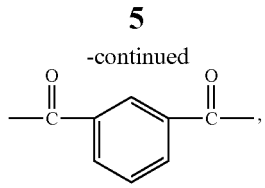

in which G" is —C$_2$H$_4$—O—C$_4$H$_8$—;
(f) a dicarboxylic acid-polytetramethylene ether glycol block structure having a general formula represented by formula (6):

formula (6)

in which R" is defined as above, P is the remaining divalent group after removing two hydroxyl groups from the polytetramethylene ether glycol, and a weight average molecular weight of P ranges from 650 g/mole to 4000 g/mole;
(g) a metal catalyst residue or a mixture of the metal catalyst residue;
(h) an antioxidant residual functional group or a mixture of the antioxidant residual functional group;
(i) a residual functional group of a chain extender;
(j) a chemical foaming agent residue; and
(k) a filler,
in which the multi-block copolyester ether thermoplastic elastomer foam has a closed-cell structure and has a specific gravity of 0.19 to 0.24.

In some embodiments, a metal catalyst in the metal catalyst residue is a monovalent metal compound, a divalent metal compound, or a combination thereof.

In some embodiments, a permanent compression set value (rate) of the multi-block copolyester ether thermoplastic elastomer foam is not higher than 50%.

In some embodiments, a rebound rate of the multi-block copolyester ether thermoplastic elastomer foam is higher than 60%.

In some embodiments, a shore C hardness of the multi-block copolyester ether thermoplastic elastomer foam is not less than 50.

In some embodiments, the residual functional group of the chain extender includes epoxy group, isocyanate group, methylol group, imino group, or a combination thereof.

The present disclosure further provides a sport shoe midsole which is prepared from the multi-block copolyester ether thermoplastic elastomer foam mentioned above.

The present disclosure further provides a preparation method of a multi-block copolyester ether thermoplastic elastomer foam. The method includes the following steps: (1) providing a polyethylene terephthalate material reprocessed by a recycling process; (2) adding 1,4-butanediol to carry out an alcoholysis reaction with the polyethylene terephthalate, such that a first intermediate is obtained, in which a molar ratio of the 1,4-butanediol to the polyethylene terephthalate ranges from 2:1 to 10:1; (3) adding a catalyst to make the first intermediate undergo a transesterification reaction, such that a second intermediate is formed, in which the transesterification reaction occurs between 150° C. to 240° C., and the second intermediate at least includes a butylene terephthalate oligomer and an ethylene terephthalate oligomer; (4) adding polytetramethylene ether glycol to carry out a polymerization reaction with the second intermediate, such that a multi-block copolyester ether thermoplastic elastomer is obtained; and (5) performing a chemical foaming process, such that the multi-block copolyester ether thermoplastic elastomer is prepared into a foam, in which based on 100 parts by weight of the multi-block copolyester ether thermoplastic elastomer foam, a content of the polyether diol block structure is 45 parts by weight to 65 parts by weight, and the multi-block copolyester ether thermoplastic elastomer foam has a melting point not higher than 170° C. and a melt flow index less than 20 g/10 min.

In some embodiments, the first intermediate includes terephthalic acid, isophthalic acid, bishydroxyethyl terephthalate, bishydroxybutyl terephthalate, bishydroxyethyl isophthalate, bishydroxybutyl isophthalate, bishydroxyethyl adipate, bishydroxybutyl adipate, 1,4-butanediol, ethylene glycol, diethylene glycol, or a combination thereof.

In some embodiments, the catalyst is a monovalent metal compound, a divalent metal compound, or a combination thereof.

In some embodiments, the catalyst is a titanium compound, a tin compound, an antimony compound, or a combination thereof.

In some embodiments, step (3) further includes: after the second intermediate is formed, an excess glycol such as butanediol is extracted by vacuum.

In some embodiments, the second intermediate further includes a butylene isophthalate oligomer, an ethylene isophthalate oligomer, a butylene adipate oligomer, an ethylene adipate oligomer, or a combination thereof, and a terephthalic acid co-tetramethylene glycol ether oligomer, an isophthalic acid co-tetramethylene glycol ether oligomer, an adipic acid co-tetramethylene glycol ether oligomer, or a combination thereof.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
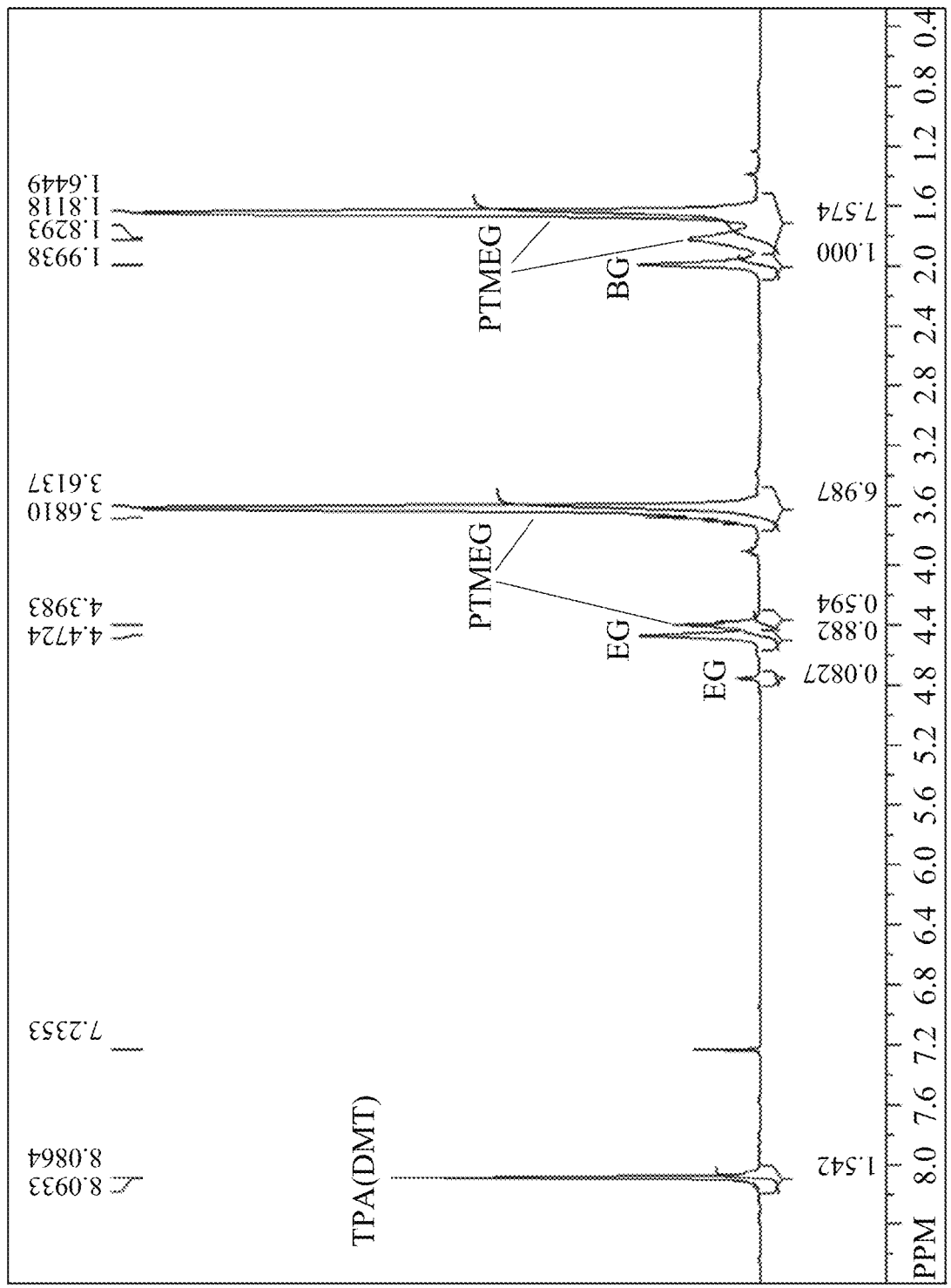
FIG. 1 shows the result of nuclear magnetic resonance analysis of Embodiment 1 of the present disclosure.

Reference will now be made in detail to the present embodiments of the disclosure, examples of which are illustrated in the accompanying drawings. Wherever possible, the same reference numbers are used in the drawings and the description to refer to the same or like parts.

One aspect of the present disclosure is a preparation method of a multi-block copolyester ether thermoplastic elastomer foam, in which harmful substances will not be released during the preparation method, and thus is friendly to the environment. The preparation method includes steps (1) to (5). In step (1), polyethylene terephthalate (PET) reprocessed by a recycling process is provided. In some embodiments, the polyethylene terephthalate reprocessed by the recycling process in step (1) refers to ester pellets or filaments reprocessed d by mechanical recycling or chemical recycling process. In some embodiments, the polyethylene terephthalate in step (1) is recycled and reprocessed in a physical manner or a chemical manner, or is obtained from recycling a polyester product manufactured from a whole biomass raw material or a portion of biomass raw material. In some embodiments, recycling polyester refers to reproducing PET bottle flakes through a series of processes such as delabeling, cleaning, removing debris, cutting debris, and increasing viscosity to obtain ester pellets or filaments.

In step (2), 1,4-butanediol and polyethylene terephthalate are added and an alcoholysis reaction is carried out on the 1,4-butanediol and the polyethylene terephthalate, such that the first intermediate is obtained, in which a molar ratio of the 1,4-butanediol to the polyethylene terephthalate ranges from 2:1 to 10:1. In some embodiments, the molar ratio of the 1,4-butanediol to the polyethylene terephthalate is, for example, 2.2:1, 2.3:1, or 2.4:1. In some embodiments, 1,4-butanediol, adipic acid, and polyethylene terephthalate are added for alcoholysis and transesterification to prepare the first intermediate, in which the molar ratio of the 1,4-butanediol to the polyethylene terephthalate ranges from 2:1 to 10:1, and the molar ratio of the adipic acid to the polyethylene terephthalate ranges from 1:30 to 1:2. In some embodiments, the first intermediate includes terephthalic acid, isophthalic acid, bishydroxyethyl terephthalate, bishydroxybutyl terephthalate, bishydroxyethyl isophthalate, bishydroxybutyl isophthalate, bishydroxyethyl adipate, bishydroxybutyl adipate, 1,4-butanediol, ethylene glycol, diethylene glycol, or a combination thereof.

In step (3), a catalyst is added to make the first intermediate undergo a transesterification reaction, such that a second intermediate is formed. In some embodiments, the transesterification reaction occurs between 150° C. to 240° C., such as 160° C., 170° C., 180° C., 190° C., 200° C., 215° C. or 220° C., to avoid the 1,4-butanediol from cleaving into tetrahydrofuran due to excessive reaction temperature. In some embodiments, the second intermediate at least includes a butylene terephthalate oligomer and an ethylene terephthalate oligomer. In one embodiment, the transesterification reaction is carried out under a pressure of 3 kg/cm$^2$. When the temperature reaches 190° C., the catalyst is added, and the temperature is raised to 230° C. after maintaining for 60 minutes. At this stage, the pressure is maintained at 3 kg/cm$^2$ and the temperature is maintained at 230° C. under the conditions of stirring (with a rotation speed of 108 rpm) for 4 hours, and the 1,4-butanediol is fully refluxed to the reaction tank. Then, the pressure was released to normal pressure and maintained at 230° C. with stirring for 3 hours. The above ensures that the intermediate is mainly butylene terephthalate (BT), and ensures that at the same time, 1,4-butanediol, ethylene glycol, water, tetrahydrofuran, and mixtures thereof are released under normal pressure.

In some embodiments, the catalyst is a monovalent metal compound, a divalent metal compound, or a combination thereof. In some embodiments, the catalyst is a titanium compound, a tin compound, an antimony compound, or a combination thereof. In one embodiment, the catalyst is tetrabutyl titanium. In some embodiments, antioxidants and anti-UV absorbers may be added to avoid thermal cracking during the reaction.

The second intermediate includes ethoxy segments and butoxy segments. In some embodiments, the second intermediate further includes a butylene isophthalate oligomer, an ethylene isophthalate oligomer, a butylene adipate oligomer, an ethylene adipate oligomer, or a combination thereof, and a terephthalic acid co-tetramethylene glycol ether oligomer, an isophthalic acid co-tetramethylene glycol ether oligomer, an adipic acid co-tetramethylene glycol ether oligomer, or a combination thereof. In some embodiments, step (3) further includes removing the excess glycol (such as 1,4-butanediol) by vacuum after the second intermediate is formed. In one embodiment, after the transesterification degree reaches 95%, the excess butanediol is extracted by vacuum.

In step (4), polytetramethylene ether glycol is added to carry out a polymerization reaction with the second intermediate, such that a multi-block copolyester ether thermoplastic elastomer is obtained. In one embodiment, the polytetramethylene ether glycol and the butylene terephthalate which is the main component of the second intermediate, are added at a normal pressure of 230° C., such that a polymerization reaction is carried out. In some embodiments, the polytetramethylene ether glycol has a weight average molecular weight ranges from 650 to 2000. In some embodiments, based on a total weight of the polyester, the polytetramethylene glycol is added in an amount of 55%, 60%, 65%, or 70%.

Next, the reaction is moved to the polymerization tank for a structural rearrangement reaction. At this time, a temperature during the polymerization stage is set to be at 250° C., and the reaction is carried out under a high vacuum below 1 torr.

In some embodiments, step (4) includes adding a catalyst to facilitate the polymerization reaction, in which the catalyst includes an antimony compound, a germanium compound, a magnesium compound, a manganese compound, a phosphorus compound, a nitrogen compound, organic peroxide, or a combination thereof. In one embodiment, the catalyst is antimony trioxide.

Based on 100 parts by weight of the multi-block copolyester ether thermoplastic elastomer, a content of the polytetramethylene glycol is 45 parts by weight to 65 parts by weight. The multi-block copolyester ether thermoplastic elastomer prepared has a melting point not higher than 170° C., a melt flow index less than 20 g/10 min, and a relative viscosity of 2.3 to 3.55.

In step (5), the multi-block copolyester ether thermoplastic elastomer is used to form a multi-block copolyester ether thermoplastic elastomer foam. In some embodiments, step (5) includes performing a chemical foaming process to prepare the copolyester ether thermoplastic elastomer foam, which includes feeding the multi-block copolyester ether thermoplastic elastomer into a Banbury mixer, and then sequentially adding an activator, filler, lubricant, chain extender, and foaming agent, and the mix them uniformly to form a compounded product. Next, the compounded product is put into an air-cut granulator, and extruded into pellets to form compounded particles. Then, the compounded particles are placed in a foaming mold to be molded and foamed, thereby obtaining the multi-block copolyester ether thermoplastic elastomer foam.

In some embodiments, based on 100 parts by weight of the multi-block copolyester ether thermoplastic elastomer, additives are added in proportion, for example, 0.5 to 5 parts by weight of the activator, 5 to 20 parts by weight of the filler, 0 to 5 parts by weight of the lubricant, 1 to 20 parts by weight of the chain extender, and 0.5 to 10 parts by weight of the foaming agent. In some embodiments, the activator includes metal oxides, zinc oxide, and magnesium oxide. In some embodiments, the filler includes talcum powder and calcium carbonate. In some embodiments, the lubricant includes stearic acid and unsaturated fatty acids. In some embodiments, the chain extender includes a polymer modified with epoxy resin groups, and the weight average molecular weight of the chain extender ranges from 3000 to 7000, in which the equivalence of the epoxy resin group ranges from 200 to 500 g/mol. In some embodiments, the foaming agent includes azodimethylamide, azodimethylthiamine, sodium bicarbonate, 4,4-oxybisbenzenesulfohydrazine, dinitrosopentamethyltetramine, or a combination thereof.

It is worth noting that the multi-block copolyester ether thermoplastic elastomer foam prepared by the preparation method of the present disclosure includes copolyester ether, in which the copolyester ether includes a hard chain structure and a soft chain structure. The hard chain structure includes short-chain diols, while soft chain structure includes long-chain diols. In some embodiments, the hard chain structure has both an aromatic dicarboxylic acid ethylene glycol ester block structure and an aromatic dicarboxylic acid butylene glycol ester block structure (e.g., the ethoxy group and the butoxy group). In some embodiments, the long-chain diols of the soft chain structure may be, for example, polytetramethylene ether glycol.

Since the hard chain structure includes multiple structures with different numbers of carbon (i.e. bishydroxyethyl ester and bishydroxybutyl ester), this will cause the phase separation of the microcrystalline region of the hard chain structure, thereby changing the hardness, permanent compression set value (rate), rebound rate, and shock absorption and cushioning value of the copolyester ether. Accordingly, the multi-block copolyester ether thermoplastic elastomer foam formed by foaming the copolyester ether has the advantages of lightweight, low permanent deformation rate, and high rebound rate.

Another aspect of the present invention is a multi-block copolyester ether thermoplastic elastomer foam, which is prepared from an aromatic polyester compound. The multi-block copolyester ether thermoplastic elastomer foam includes a short-chain structure, a long-chain segment structure, and a residual functional group of a chain extender. The long-chain structure has a polyether diol block structure, in which based on 100 parts by weight of the multi-block copolyester ether thermoplastic elastomer foam, a content of the polyether diol block structure is 45 parts by weight to 65 parts by weight. The multi-block copolyester ether thermoplastic elastomer foam has a melting point not higher than 170° C. and a melt flow index less than 20 g/10 min.

In some embodiments, the aromatic dicarboxylic acid ethylene glycol ester block structure and the aromatic dicarboxylic acid butylene glycol ester block structure are formed by a depolymerization or partial depolymerization reaction of the aromatic polyester compound. The depolymerization or partial depolymerization reaction is alcoholysis, aminolysis, or hydrolysis. In a preferred embodiment, the depolymerization or partial depolymerization reaction is alcoholysis, aminolysis or hydrolysis.

In some embodiments, the aromatic dicarboxylic acid ethylene glycol ester block structure and the aromatic dicarboxylic acid butylene glycol ester block structure formed by the depolymerization or partial depolymerization reaction of the aromatic polyester compound include p-phenylene, m-phenylene, or a combination thereof.

In some embodiments, the short-chain structure further includes a block structure formed by an esterification reaction of a C2 to C6 aliphatic dicarboxylic acid and a C2 to C4 diol. In some embodiments, the C2 to C6 aliphatic dicarboxylic acid includes glutaric acid, adipic acid, lactic acid, or a combination thereof. In some embodiments, the C2 to C4 diol includes ethylene glycol, butanediol, or a combination thereof.

In some embodiments, the polyether diol block structure is formed by a reaction of a polytetramethylene ether glycol and a depolymerized reaction product, which is formed by a depolymerization or partial depolymerization reaction of the aromatic polyester compound, in which a weight average molecular weight of the polytetramethylene ether glycol ranges from 650 g/mole to 4000 g/mole.

In some embodiments, the polyether diol block structure further includes a block structure formed by an esterification reaction of a C2 to C6 aliphatic dicarboxylic acid and a polytetramethylene ether glycol.

In some embodiments, the residual functional group of the chain extender includes epoxy group, isocyanate group, methylol group, imino group, or a combination thereof.

In some embodiments, the multi-block copolyester ether thermoplastic elastomer foam further includes a sulfonic acid group residue, in which the sulfonic acid group residue is selected from the group consisting of 5-sulfoisophthalic acid, 5-sulfoisophthalic acid sodium salt, and a combination thereof.

In some embodiments, the aromatic polyester compound has a divalent group as follows:

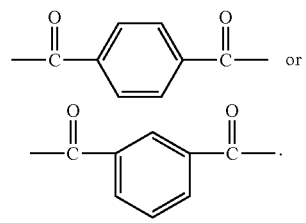

Another aspect of the present disclosure is a multi-block copolyester ether thermoplastic elastomer foam which includes the following (a) to (k):

(a) an aromatic dicarboxylic acid ethylene glycol ester block structure having a general formula represented by formula (1):

formula (1)

in which R is a divalent group formed by a depolymerization or partial depolymerization reaction of an aromatic polyester compound as follows:

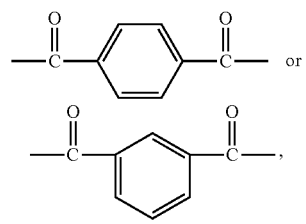

in which G is —$C_2H_4$—;

(b) an aromatic dicarboxylic acid butylene glycol ester block structure having a general formula represented by formula (2):

formula (2)

in which R is as defined above, and G' is —$C_4H_8$—;

(c) an aliphatic dicarboxylic acid ethylene glycol ester block structure having a general formula represented by formula (3):

Formula (3)

in which R' is a C2 to C6 divalent aliphatic functional group, and G is as defined above;

(d) an aliphatic dicarboxylic acid butylene glycol ester block structure having a general formula represented by formula (4):

Formula (4)

in which R and G are as defined above;

(e) a polyester ether block structure having a general formula represented by formula (5):

formula (5)

in which R" is a C2 to C6 divalent aliphatic functional group or a divalent group formed by a depolymerization or partial depolymerization reaction of the aromatic polyester compound as follows:

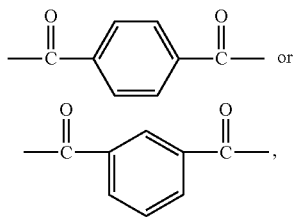

in which G is —$C_2H_4$—O—$C_4H_8$—;

(f) a dicarboxylic acid-polytetramethylene ether glycol block structure having a general formula represented by formula (6):

formula (6)

in which R" is defined as above, P is the remaining divalent group after removing two hydroxyl groups from the polytetramethylene ether glycol, and a weight average molecular weight of P ranges from 650 g/mole to 4000 g/mole;

(g) a metal catalyst residue or a mixture of the metal catalyst residue;
(h) an antioxidant residual functional group or a mixture of the antioxidant residual functional group;
(i) a residual functional group of a chain extender;
(j) a chemical foaming agent residue; and
(k) a filler,
in which the multi-block copolyester ether thermoplastic elastomer foam has a closed-cell structure and has a specific gravity of 0.19 to 0.24.

In some embodiments, a metal catalyst in the metal catalyst residue is a monovalent metal compound, a divalent metal compound, or a combination thereof.

In some embodiments, a permanent compression set value (rate) of the multi-block copolyester ether thermoplastic elastomer foam is not higher than 50%. In some embodiments, a rebound rate of the multi-block copolyester ether thermoplastic elastomer foam is higher than 60%. In some embodiments, a shore C hardness of the multi-block copolyester ether thermoplastic elastomer foam is not less than 50.

In some embodiments, the residual functional group of the chain extender includes epoxy group, isocyanate group, methylol group, imino group, or a combination thereof. In some embodiments, the residual functional group of the chain extender is formed by the reacted polymer modified by the epoxy resin group, in which a molecular weight of the polymer ranges from 3000 to 7000, and an equivalence weight of the epoxy resin group ranges from 200 g/mol to 500 g/mol.

In some embodiments, the residue formed after the reaction of the chemical foaming agent is obtained from the reaction of the foaming agent. In some embodiments, the foaming agent includes azodimethylamide, azodimethylthiamine, sodium bicarbonate, 4,4-oxybisbenzenesulfohydrazine, dinitrosopentamethyltetramine, or a combination thereof.

Another aspect of present disclosure is a sport shoe midsole which is prepared from the multi-block copolyester ether thermoplastic elastomer foam mentioned above, in which the multi-block copolyester ether thermoplastic elastomer foam has a specific gravity of 0.19 to 0.24. The sport shoe midsole which is prepared from the multi-block copolyester ether thermoplastic elastomer foam mentioned above has the advantages of lightweight, low permanent deformation rate, and high rebound rate.

The following embodiments are used to describe specific aspects of the present disclosure in detail, and to enable those skilled in the art to practice the present disclosure. The following embodiments should not be construed to limit the present disclosure.

Embodiment 1

200 g of polyethylene terephthalate reprocessed from recycled bottle flakes was taken to be mixed with 1,4-butanediol to carry out an alcoholysis reaction, such that the first intermediate is obtained. The molar ratio of the 1,4-butanediol to reprocessed polyethylene terephthalate is 2.4:1. Then, a tetrabutyl titanium is added as catalyst under 190° C., and the temperature is raised to 230° C. and maintained a pressure of 3 kg/cm² for 60 minutes to carry out a transesterification reaction. After the transesterification conversion reaches 95%, excess glycol such as butanediol is extracted by vacuum, such that a second intermediate is obtained. Polytetramethylene ether glycol is then added and reacted with second intermediate to carry out a polymerization reaction at normal pressure and 230° C. to form the multi-block copolyester ether thermoplastic elastomer. The multi-block copolyester ether thermoplastic elastomer has a melting point 130° C. and a melt flow index (MFI) about 9 g/10 min at measure temperature 200° C. 1.5 g of zinc oxide activator and 20 g of talcum powder filler were put into a Banbury mixer for a first compounding process. The multi-block copolyester ether thermoplastic elastomer in Embodiment 1 included the short-chain structure and the long-chain structure. The short-chain structure included ethoxy-group and butoxy-group, in which the molar ratio of ethoxy-group to butoxy-group was about 1:5, while the long-chain structure derived from polytetramethylene ether glycol, in which the addition amount of polytetramethylene ether glycol was 65%. 1 g of stearic acid, 12 g of chain extender (epoxy copolymer, commercially available model ADR4370), and 4 g of chemical foaming agent were added for a second compounding process, in which the compounding temperature was 130° C.

Next, the compounded product placed in a foaming mold for molding and foaming, in which the foaming temperature is 160° C. to obtain a closed-cell foam structure.

The hardness, specific gravity, permanent compression set value (rate), rebound rate, and shock absorption test of the obtained foam were tested and recorded. The related results listed in Table 2. The standard test method for testing hardness was ASTM D2240, in Shore C. The standard test method for testing specific gravity was ASTM D297. The standard test method for testing permanent compression set value (rate) was ASTM D395, in which the test conditions included steps of providing a compression ratio of 50%, placing in an environment of 50° C., and maintaining for 6 hours. If the permanent compression set value (rate) of the detected foam is too high, it means that the detected foam cannot be restored to its original size, which means that the deformation recovery rate is bad. The standard test method for testing rebound rate was ASTM D2632. The standard test method for testing shock absorption testing was SATRA TM142.

In addition, the structure of the copolyester ether of Embodiment 1 was verified by nuclear magnetic resonance analysis, and the results shown in FIG. 1. It was found that the copolyester ether of Embodiment 1 indeed included both ethoxy-group and butoxy-group chain structures.

The preparation methods of Embodiments 2 to 5 are roughly similar to the preparation methods of Embodiment 1. The weight average molecular weights (Mw) of the polytetramethylene ether glycol used in Embodiments 2 to 5 were 1000, 2000, 4000, and 650, respectively. In addition, Embodiment 2 further included a small amount of adipic acid.

Comparative Example 1

Figure 2:
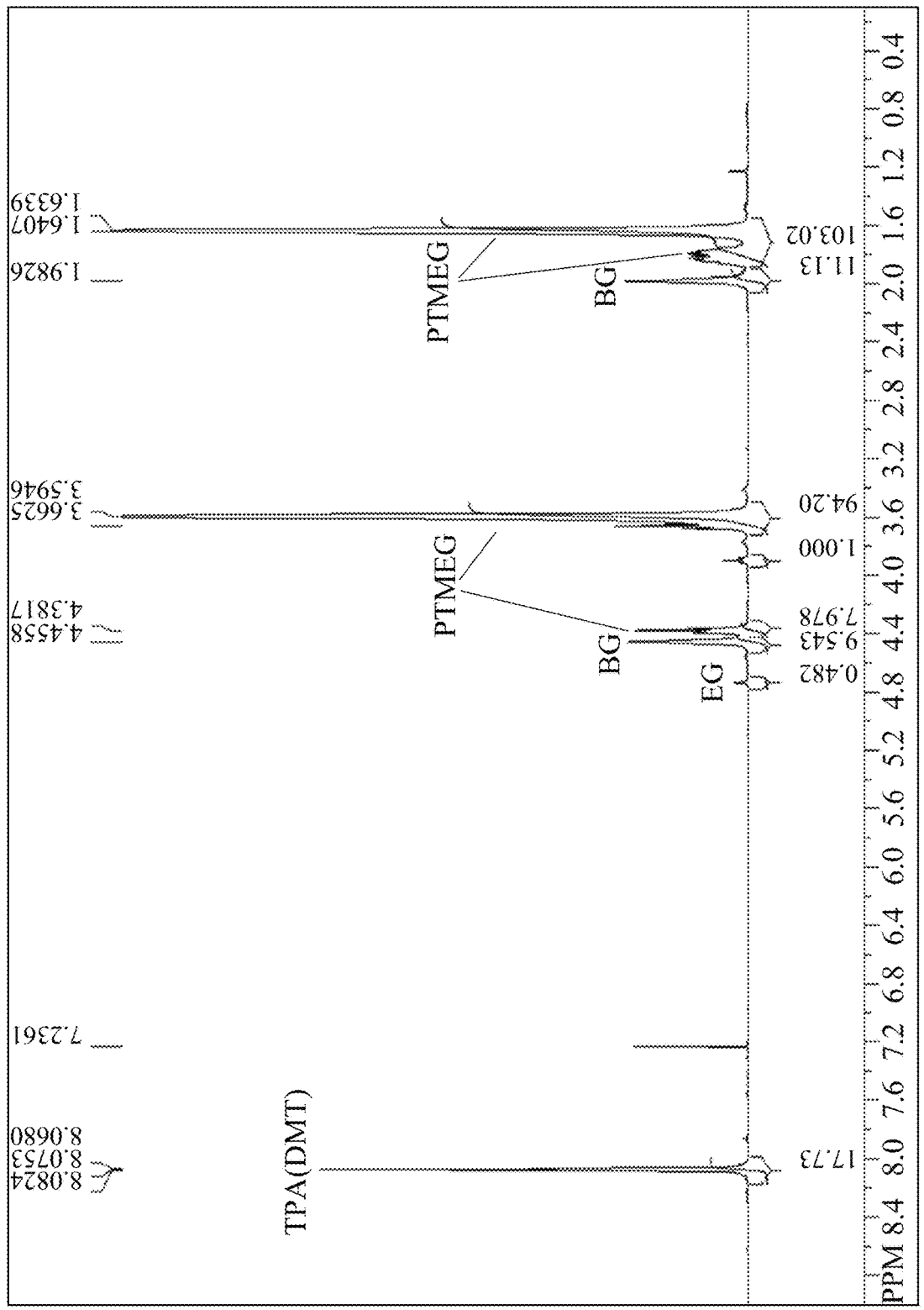
FIG. 2 and FIG. 3 respectively show the results of nuclear magnetic resonance analysis of Comparative Example 1 and Comparative Example 2.

The steps of Comparative Example 1 were roughly the same as the steps of Embodiment 1, except that in Comparative Example 1, the ingredient of the copolyester ether changed, in which the addition amount of polytetramethylene ether glycol changed to 70%. The results of nuclear magnetic resonance analysis of the copolyester ether of Comparative Example 1 shown in FIG. 2.

Comparative Example 2

Figure 3:
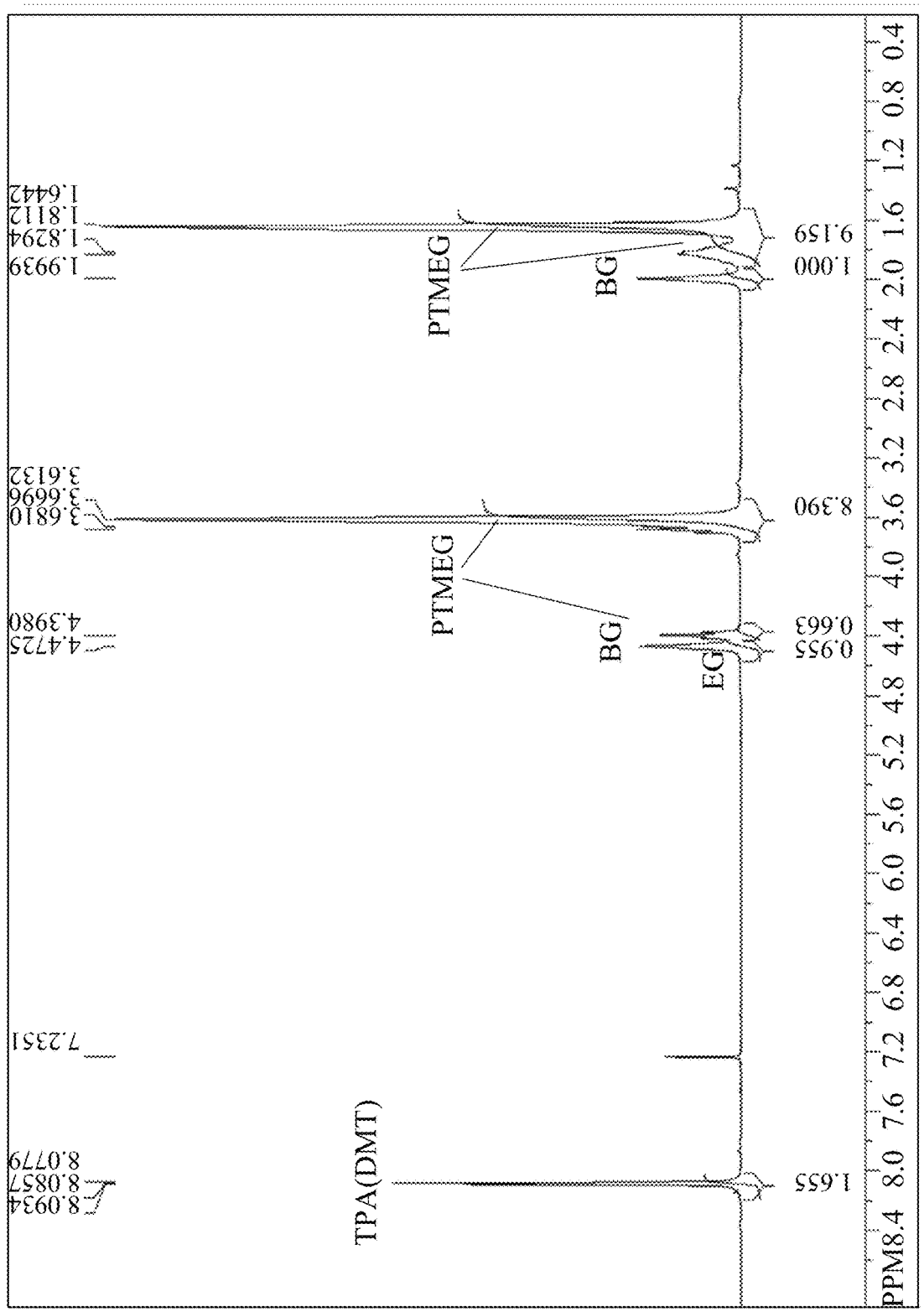

In the copolyester ether prepared in Comparative Example 2, the short-chain diols were ethylene glycol and butanediol, and the addition amount of polytetramethylene ether glycol was 70%. The polyester source used in Comparative Example 2 was a biomass raw material obtained from esterification and polymerization of dibasic acid, short-chain diols, and polytetramethylene ether glycol. In a 50 kg reaction apparatus, 21.6 kg of terephthalic acid (TPA), 8 kg of ethylene glycol, 11.7 kg of 1,4-butanediol, and 19.5 kg of polytetramethylene ether glycol (in which a molar ratio of COOH/OH was 1.5) were mixed and to carry out the esterification reaction. The catalyst used in the esterification reaction was tetraisopropane titanate (TIP), and the addition amount of the catalyst was 16 g. The temperature of the esterification was initially set to be 150° C., and raised gradually to reach about 220° C., and maintained for 6 hours, the reaction was moved to the polymerization tank to carry out the polymerization reaction (at this time, the esterification conversion was about 95%). Then, a polymerization reaction was carried out, in which the polymerization temperature was 250° C., and the vacuum was controlled below 1 torr. When the viscosity of the polymer reached the required set value, sampling and analysis were performed, and tests such as relative viscosity (RV) were performed. NMR analysis test was followed up. The results of nuclear magnetic resonance analysis of the copolyester ether of Comparative Example 2 shown in FIG. 3.

Next, 200 g of copolyester ether described in previous steps, 3 g of zinc oxide activator, 20 g of talcum powder filler were put into a Banbury mixer for compounding, and then the compounding product was foamed. The compounding step and foaming step of Comparative Example 2 were similar to the compounding step and foaming step of Embodiment 1. The difference was that the amount of chain extender ADR4370 in the compounding step reduced to 6 g.

Comparative Example 3

The steps of the Comparative Example 3 were the same as the steps of the Comparative Example 2, except that the ingredient of the copolyester ether changed in the Comparative Example 3, in which the short-chain diol in the copolyester ether was ethylene glycol, and the addition amount of polytetrafluoroethylene methylene ether glycol was 65%.

Comparative Example 4

Comparative example 4 is a commercially available midsole foam material for sports shoe, which is a finished product of physical foaming of TPU.

Table 1 lists the addition amount, relative viscosity, melting point, melt flow index, the ingredients of diol and diacid in Embodiments 1-5 and Comparative Examples 1-3. The melt flow index was tested at a temperature of 200° C. and a loading of 2.16 kg.

TABLE 1

| | Diol | | | | Diacid | | Relative viscosity | Melting point | Melt flow index |
|---|---|---|---|---|---|---|---|---|---|
| | Ethylene Glycol Amount (wt %) | Butylene Glycol Amount (wt %) | Polytetramethylene ether glycol Amount (wt %) | Mw | main | minor | | | |
| Embodiment 1 | 0 | 100 | 65 | 1000 | Depolymerized Recycled PET | — | 3.9 | 130 | 8.87 |
| Embodiment 2 | 0 | 100 | 65 | 1000 | Depolymerized Recycled PET | Adipic acid (1.8%) | 3.7 | 124 | 10.5 |
| Embodiment 3 | 0 | 100 | 65 | 2000 | Depolymerized Recycled PET | — | 4.0 | 150 | 8.0 |
| Embodiment 4 | 0 | 100 | 65 | 4000 | Depolymerized Recycled PET | — | 4.3 | 165 | 7.5 |
| Embodiment 5 | 0 | 100 | 65 | 650 | Depolymerized Recycled PET | — | 3.0 | 100 | 19 |
| Comparative Example 1 | 0 | 100 | 70 | 1000 | Depolymerized Recycled PET | — | 3.65 | 130 | 17.82 |
| Comparative Example 2 | 40 | 60 | 70 | 1000 | terephthalic acid | — | 3.7 | 130 | 11.42 |
| Comparative Example 3 | 100 | 0 | 65 | 1000 | terephthalic acid | — | Cannot be polymerized | | |

Table 2 lists the physical property test results of foaming Embodiments 1A-1D and Comparative Example 1, Comparative Example 2, and Comparative Example 4. The physical property test results include hardness (Shore C), specific gravity (g/cm³), average pore size (μm), permanent compression set value (rate) (%), rebound rate (%), shock absorption buffer (g value), etc. of the foam.

TABLE 2

| Physical property of foam | Chain extender (g) | Hardness (Shore C) | Specific gravity (g/cm³) | Average pore size (μm) | permanent compression set value (rate) (%) | Rebound rate (%) | Shock-absorption and cushion value (g value) |
|---|---|---|---|---|---|---|---|
| Embodiment 1A | 12 | 55 | 0.24 | 174 | 39 | 62 | 15 |
| Embodiment 1B | 10 | 55 | 0.23 | 147 | 45 | 62 | 14.5 |
| Embodiment 1C | 8 | 51 | 0.21 | 145 | 50 | 61 | 14.5 |
| Embodiment 1D | 6 | 47 | 0.19 | 179 | 50 | 62 | 14.5 |
| Comparative Example 1 | 12 | | | Foam cannot be formed | | | |
| Comparative Example 2 | 12 | 42 | 0.17 | 159 | 57 | 57 | 10.1 |
| Comparative Example 4 | TPU physically foamed products | 41 | 0.18 | 76 | 50 | 55 | 13.5 |

It can be seen from Table 1 and Table 2 that the multi-block copolyester ether thermoplastic elastomer foam of the present disclosure could meet the requirements of sports shoes for lightweight, low permanent compression set value (rate), and high rebound rate. Specifically, for Example 1A to Example 1D, the rebound rate was greater than 60%, and at the same time, good shock absorption and cushion ability can be maintained (g value is about 14-15). However, the rebound rate of Comparative Example 2 and Comparative Example 4 was lower than 60%, and the shock absorption and cushion ability was low (g value is about 10-14), which shows that the multi-block copolyester ether thermoplastic elastomer foam of the present disclosure is very suitable for sports shoes. In addition, the hardness of Embodiments 1A to 1D was similar to the hardness of the commercially available midsole foam material (the hardness (Shore C) is about 47-55), but Embodiments 1A to 1 D can provide better shock absorption and cushioning.

Table 3 lists the nuclear magnetic resonance analysis test results of Embodiment 1, Comparative Example 5, Embodiment 2 and Comparative Example 6.

TABLE 3

| NMR analysis | Manufacturing process | Mole number % calculated by NMR analysis | | | | | |
|---|---|---|---|---|---|---|---|
| | | Acid composition | | | Alcohol composition | | |
| | | TPA | IPA | AA | EG | BG | PTMEG |
| Embodiment 1 | Recycled PET Alcoholysis polymerization | 43.3 | — | 0 | 3.9 | 30.7 | 19.7 |
| Comparative Example 1 | Virgin PET Esterification polymerization | 43.0 | — | 0 | 1.5 | 34.4 | 19.4 |
| Embodiment 2 | Recycled PET Alcoholysis polymerization | 41.9 | — | 2.5 | 3.4 | 29.5 | 19.7 |
| Comparative Example 6 | Virgin PET Esterification polymerization | 42.2 | — | 2.0 | 1.0 | 33.6 | 19.2 |

Comparative Example 5 is a special comparative example, which is a copolyester ether formed by a general copolymerization method, in which TPA, IPA, EG, BG, and PTMEG were added according to the theoretical ratio of the components of Embodiment 1. Comparative Example 5 is used for comparison of NMR and XRD analysis experiments. The purpose is to compare the influence of different processes on the molecular structure of copolyester ethers and to identify the difference between block structure or random structure.

As can be seen from FIG. 1 and Table 3, the hard chain structure of the copolyester ether obtained by the method of the present disclosure included both ethoxy (EG) and butoxy (BG) chain structures. In the case of using the same ratio of the diol composition distribution, the content ratio of the ethoxy chain (EG) significantly increased when using the technology of the present disclosure compared with the general copolymerization synthesis method, in which the ethoxy and butoxy groups could cause phase separation in the crystallite region. In addition, it should be noted that if the conventional copolyester ether has a block structure, its melting point is usually higher than 200° C. If the melting point expected to be lower than 200° C., the proportion of the soft chain structure must be increased, and the structure tends to be random. However, the copolyester ether thermoplastic elastomer of the present disclosure is a multi-block structure, the melting point is not higher than 170° C., and the crystallinity is high. Because the characteristics of the block structure improve the crystal arrangement, hence it can be seen that the structure of the multi-block copolyester ether thermoplastic elastomer of the present disclosure is indeed different from the structure of conventional copolyester ether, such that the rebound rate of the foamed material of the multi-block copolyester ether thermoplastic elastomer of the present disclosure is all greater than 60%.

Figure 4:
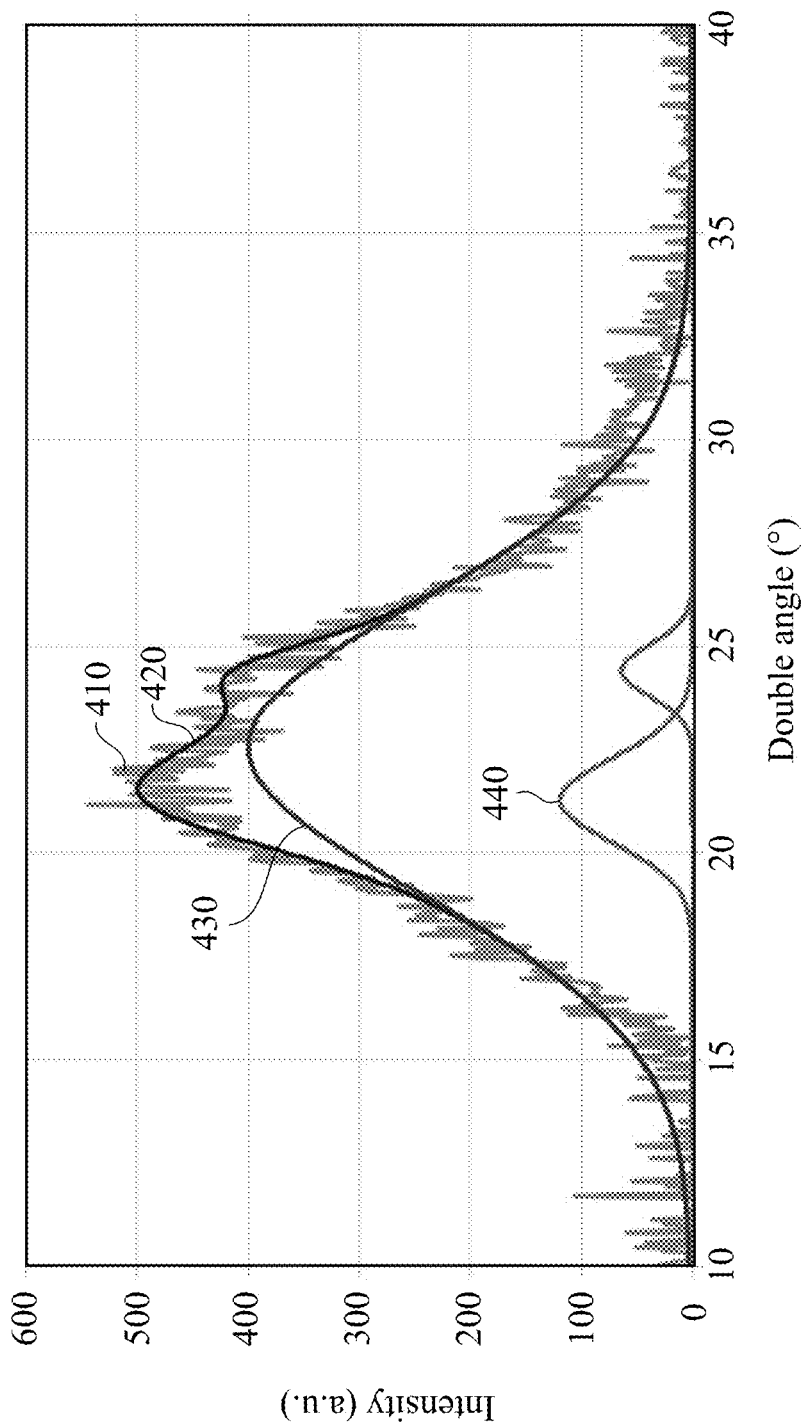
FIG. 4 shows the result of X-ray diffraction analysis (XRD analysis) of Embodiment 1 of the present disclosure.
Figure 5:
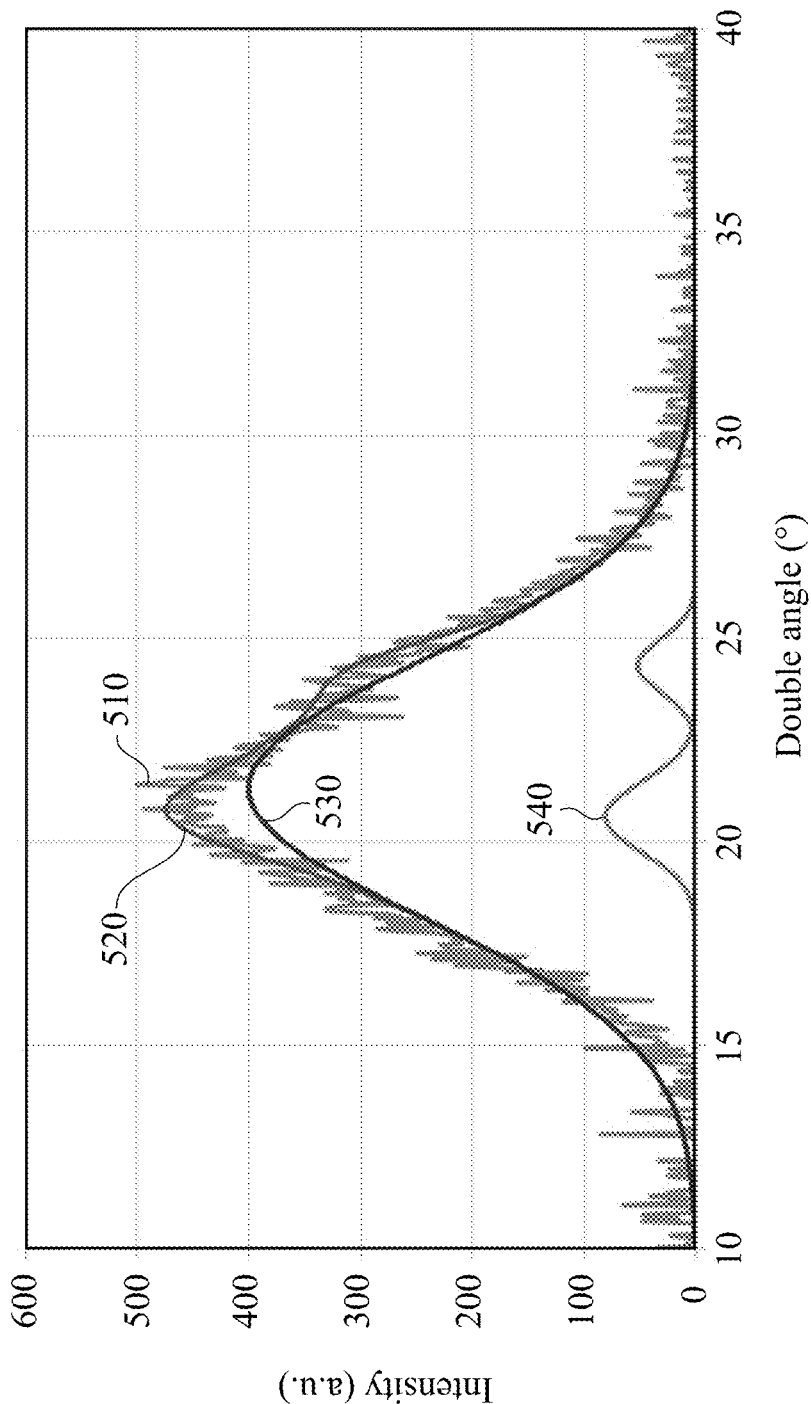
FIG. 5 shows the result of XRD analysis of Comparative Example 5.

FIG. 4 shows the results of X-ray diffraction analysis (XRD analysis) in Embodiment 1. FIG. 5 shows the results of XRD analysis of Comparative Example 5. As shown in FIG. 4, the curve 410 is the measurement curve; the curve 420 is the fitting curve; the curve 430 is the fitting curve of the amorphous form; and the curve 440 is the fitting curve of the crystalline form. As shown in FIG. 5, the curve 510 is the measurement curve; the curve 520 is the fitting curve; the curve 530 is the fitting curve of the amorphous form; and the curve 540 is the fitting curve of the crystalline form. Table 4 lists the XRD areas of Embodiment 1 and Comparative Example 5. X-ray diffraction analysis is to generate a spectrum through the diffraction of X-ray and crystal, and compare the spectrum database to deduce the arrangement structure of material crystal.

TABLE 4

| | Peak area | | | |
|---|---|---|---|---|
| | Amorphous peak | Crystalline peak 1 | Crystalline peak 2 | Crystallinity |
| Embodiment 1 | 3985.7 | 338.9 | 111.8 | 10.2% |
| Comparative Example 5 | 4161.6 | 225.08 | 111.3 | 7.5% |

In the XRD pattern of Embodiment 1, it can be found that a hump signal representing the amorphous region and the peak signal (at the arrow) representing the crystalline appeared between 15° and 30°. On the other hand, in the XRD pattern of Comparative Example 5, only the hump signal representing the amorphous region could be seen. This means that the crystallinity of Embodiment 1 is higher than the crystallinity of Comparative Example 5.

Although the composition of the chain is the same, the chain distribution is different due to different manufacturing processes. The chain distribution of Embodiment 1 is large-chain composition (blocks), while the chain distribution of Comparative Example 5 is micro-chain composition randomly distributed. In contrast, the chain distribution of Embodiment 1 is more ordered, which facilitates crystallographic arrangement, such that the crystallinity is higher.

Figure 6:
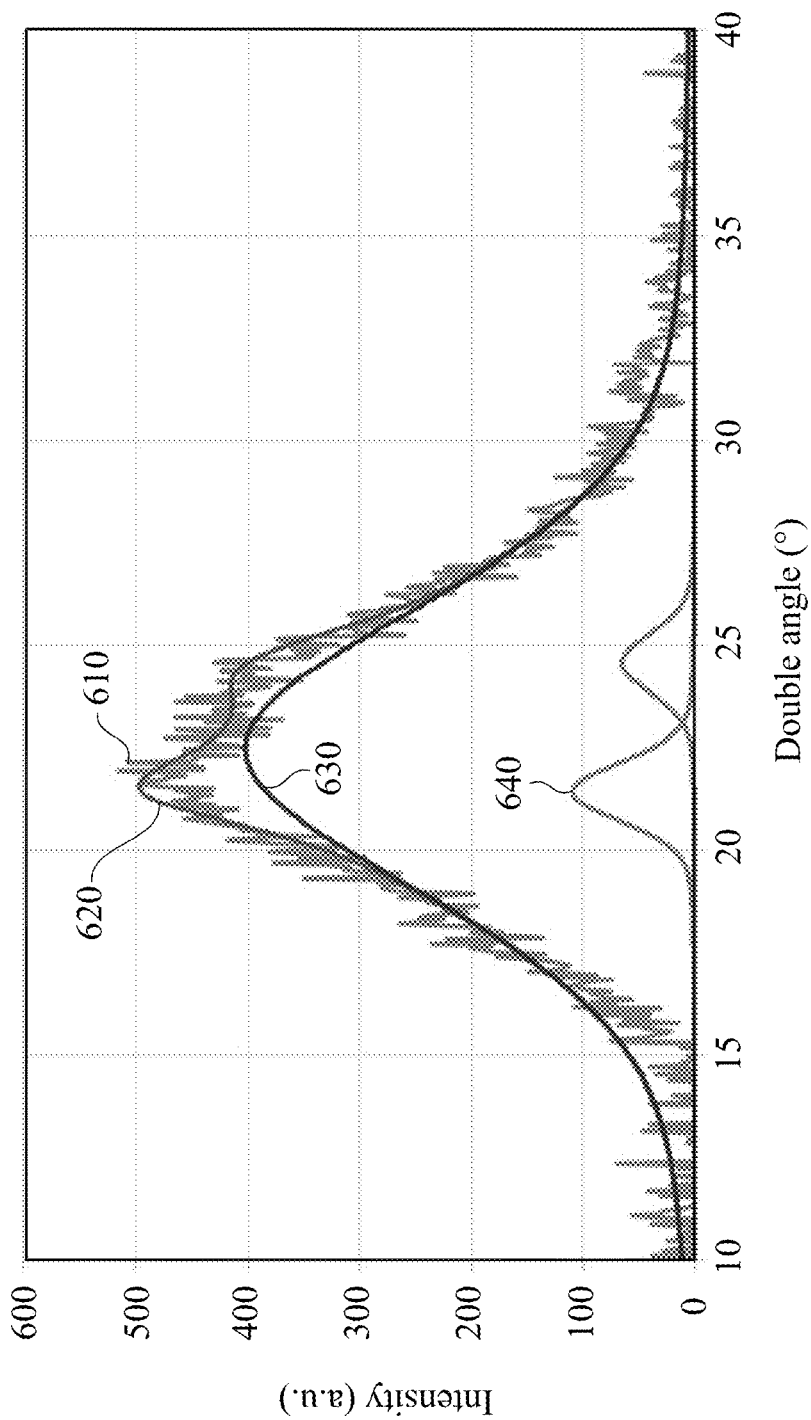
FIG. 6 shows the result of XRD analysis of Embodiment 2 of the present disclosure.
Figure 7:
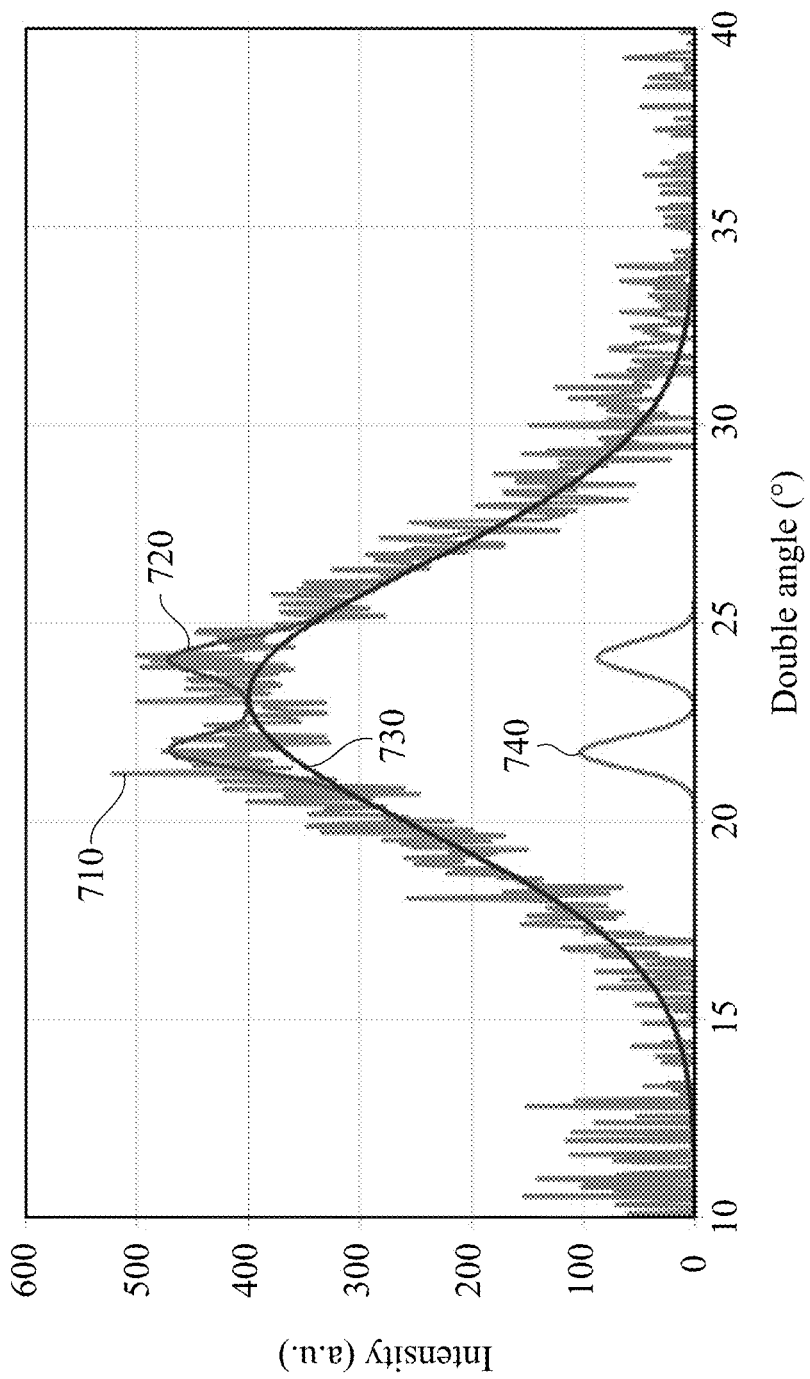
FIG. 7 shows the result of XRD analysis of Comparative Example 6.

FIG. 6 is the XRD analysis result of Example 2. FIG. 7 is the XRD analysis result of Comparative Example 6. As shown in FIG. 6, the curve 610 is the measurement curve; the curve 620 is the fitting curve; the curve 630 is the fitting curve of the amorphous form; and the curve 640 is the fitting curve of the crystalline form. As shown in FIG. 7, the curve 710 is the measurement curve; the curve 720 is the fitting curve; the curve 730 is the fitting curve of the amorphous form; and the curve 740 is the fitting curve of the crystalline form. Table 5 lists the XRD areas of Example 2 and Comparative Example 6. X-ray diffraction analysis is to generate a spectrum through the diffraction of X-ray and crystal, and compare the spectrum database to deduce the arrangement structure of material crystal. The monomer composition of Example 2 is the same as the monomer composition of Comparative Example 6. In the presence of the aliphatic diacid structure, the overall crystallinity (8.2%) of Example 2 is still higher than the overall crystallinity (5.3%) of Comparative Example 6, which represents that the chain distribution of the present disclosure (alcoholysis reaction product) is large chain (preferring to be blocks).

TABLE 5

|  | Peak area | | | |
| --- | --- | --- | --- | --- |
|  | Amorphous peak | Crystalline peak 1 | Crystalline peak 2 | Crystallinity |
| Embodiment 2 | 4807.4 | 268.1 | 163.9 | 8.2% |
| Comparative Example 6 | 1780.9 | 53.8 | 46.1 | 5.3% |

In addition, the preparation method of the present disclosure will not release harmful substances during the manufacturing process, and is friendly to the natural environment. In addition, the preparation method of the present invention adopts recycled bottle flakes to re-manufacture, and uses all biomass raw materials or ester particles or fiber filaments obtained from part of the biomass raw materials as the source of polyethylene terephthalate.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A multi-block copolyester ether thermoplastic elastomer foam prepared from an aromatic polyester compound, comprising:
    a short-chain structure having an aromatic dicarboxylic acid ethylene glycol ester block structure and an aromatic dicarboxylic acid butylene glycol ester block structure;
    a long-chain structure having a polyether diol block structure; and
    a residual functional group of a chain extender,
    wherein based on 100 parts by weight of the multi-block copolyester ether thermoplastic elastomer foam, a content of the polyether diol block structure is 45 parts by weight to 65 parts by weight, and the multi-block copolyester ether thermoplastic elastomer foam has a melting point not higher than 170° C. and a melt flow index less than 20 g/10 min.

2. The multi-block copolyester ether thermoplastic elastomer foam of claim 1, wherein the aromatic dicarboxylic acid ethylene glycol ester block structure and the aromatic dicarboxylic acid butylene glycol ester block structure are formed by a depolymerization or partial depolymerization reaction of the aromatic polyester compound.

3. The multi-block copolyester ether thermoplastic elastomer foam of claim 2, wherein the aromatic dicarboxylic acid ethylene glycol ester block structure and the aromatic dicarboxylic acid butylene glycol ester block structure formed by the depolymerization or partial depolymerization reaction of the aromatic polyester compound comprise p-phenylene, m-phenylene, or a combination thereof.

4. The multi-block copolyester ether thermoplastic elastomer foam of claim 1, wherein the short-chain structure further comprises a block structure formed by an esterification reaction of a C2 to C6 aliphatic dicarboxylic acid and a C2 to C4 diol.

5. The multi-block copolyester ether thermoplastic elastomer foam of claim 4, wherein the C2 to C6 aliphatic dicarboxylic acid comprises glutaric acid, adipic acid, lactic acid, or a combination thereof.

6. The multi-block copolyester ether thermoplastic elastomer foam of claim 4, wherein the C2 to C4 diol comprises ethylene glycol, butanediol, or a combination thereof.

7. The multi-block copolyester ether thermoplastic elastomer foam of claim 1, wherein the polyether diol block structure is formed by a reaction of a polytetramethylene ether glycol and a depolymerized reaction product, which is formed by a depolymerization or partial depolymerization reaction of the aromatic polyester compound, wherein a weight average molecular weight of the polytetramethylene ether glycol ranges from 650 g/mole to 4000 g/mole.

8. The multi-block copolyester ether thermoplastic elastomer foam of claim 1, wherein the polyether diol block structure further comprises a block structure formed by an esterification reaction of a C2 to C6 aliphatic dicarboxylic acid and a polytetramethylene ether glycol.

9. The multi-block copolyester ether thermoplastic elastomer foam of claim 1, wherein the residual functional group of the chain extender comprises epoxy group, isocyanate group, methylol group, imino group, or a combination thereof.

10. The multi-block copolyester ether thermoplastic elastomer foam of claim 1, further comprising a sulfonic acid group residue, wherein the sulfonic acid group residue is selected from the group consisting of 5-sulfoisophthalic acid, 5-sulfoisophthalic acid sodium salt, and a combination thereof.

11. The multi-block copolyester ether thermoplastic elastomer foam of claim 1, wherein the aromatic polyester compound has a divalent group as follows:

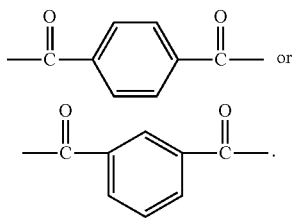

12. The multi-block copolyester ether thermoplastic elastomer foam of claim 1, wherein:
    (a) the aromatic dicarboxylic acid ethylene glycol ester block structure has a general formula represented by formula (1):

formula (1)

wherein R is a divalent group formed by a depolymerization or partial depolymerization reaction of an aromatic polyester compound as follows:

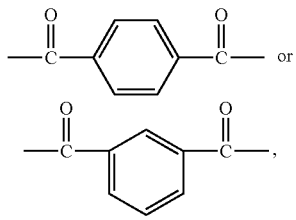

wherein G is —$C_2H_4$—;
(b) the aromatic dicarboxylic acid butylene glycol ester block structure has a general formula represented by formula (2):

formula (2)

wherein R is as defined above, and G' is —$C_4H_8$—;
wherein the multi-block copolyester ether thermoplastic elastomer foam further comprises:
(c) an aliphatic dicarboxylic acid ethylene glycol ester block structure having a general formula represented by formula (3):

formula (3)
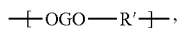

wherein R' is a C2 to C6 divalent aliphatic functional group, and G is as defined above;
(d) an aliphatic dicarboxylic acid butylene glycol ester block structure having a general formula represented by formula (4):

formula (4)
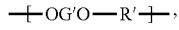

wherein R' and G' are as defined above;
(e) a polyester ether block structure having a general formula represented by formula (5):

formula (5)
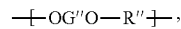

wherein R" is a C2 to C6 divalent aliphatic functional group or a divalent group formed by a depolymerization or partial depolymerization reaction of the aromatic polyester compound as follows:

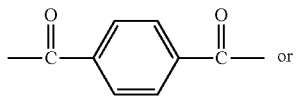

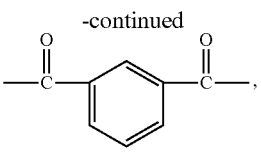

wherein G" is —$C_2H_4$—O—$C_4H_8$—;
(f) a dicarboxylic acid-polytetramethylene ether glycol block structure having a general formula represented by formula (6):

Formula (6)

wherein R" is defined as above, P is the remaining divalent group after removing two hydroxyl groups from the polytetramethylene ether glycol, and a weight average molecular weight of P ranges from 650 g/mole to 4000 g/mole;
(g) a metal catalyst residue or a mixture of the metal catalyst residue;
(h) an antioxidant residual functional group or a mixture of the antioxidant residual functional group;
(i) a residual functional group of a chain extender;
(j) a chemical foaming agent residue; and
(k) a filler,
wherein the multi-block copolyester ether thermoplastic elastomer foam has a closed-cell structure and has a specific gravity of 0.19 to 0.24.

13. The multi-block copolyester ether thermoplastic elastomer foam of claim 12, wherein a metal catalyst in the metal catalyst residue is a monovalent metal compound, a divalent metal compound, or a combination thereof.

14. The multi-block copolyester ether thermoplastic elastomer foam of claim 12, wherein a permanent compression set value of the multi-block copolyester ether thermoplastic elastomer foam is not higher than 50%.

15. The multi-block copolyester ether thermoplastic elastomer foam of claim 12, wherein a rebound rate of the multi-block copolyester ether thermoplastic elastomer foam is higher than 60%.

16. The multi-block copolyester ether thermoplastic elastomer foam of claim 12, wherein a shore C hardness of the multi-block copolyester ether thermoplastic elastomer foam is not less than 50.

17. The multi-block copolyester ether thermoplastic elastomer foam of claim 12, wherein the residual functional group of the chain extender comprises epoxy group, isocyanate group, methylol group, imino group, or a combination thereof.

18. A sport shoe midsole, prepared from the multi-block copolyester ether thermoplastic elastomer foam of claim 12.

19. A preparation method of the multi-block copolyester ether thermoplastic elastomer foam of claim 1, comprising the following steps:
(1) providing a polyethylene terephthalate material reprocessed by a recycling process;
(2) adding 1,4-butanediol to carry out an alcoholysis reaction with the polyethylene terephthalate material, such that a first intermediate is obtained, wherein a molar ratio of the 1,4-butanediol to the polyethylene terephthalate material ranges from 2:1 to 10:1;
(3) adding a catalyst to make the first intermediate undergo a transesterification reaction, such that a second intermediate is formed, wherein the transesterification reaction occurs between 150° C. to 240° C., and the second intermediate at least comprises a butylene terephthalate oligomer and an ethylene terephthalate oligomer;
(4) adding polytetramethylene ether glycol to carry out a polymerization reaction with the second intermediate, such that a multi-block copolyester ether thermoplastic elastomer is obtained; and
(5) performing a chemical foaming process, such that the multi-block copolyester ether thermoplastic elastomer is prepared into a foam.

20. The method of claim 19, wherein the first intermediate comprises terephthalic acid, isophthalic acid, bishydroxyethyl terephthalate, bishydroxybutyl terephthalate, bishydroxyethyl isophthalate, bishydroxybutyl isophthalate, bishydroxyethyl adipate, bishydroxybutyl adipate, 1,4-butanediol, ethylene glycol, diethylene glycol, or a combination thereof.

21. The method of claim 19, wherein the catalyst is a monovalent metal compound, a divalent metal compound, or a combination thereof.

22. The method of claim 19, wherein the catalyst is a titanium compound, a tin compound, an antimony compound, or a combination thereof.

23. The method of claim 19, wherein step (3) further comprises:
after the second intermediate is formed, an excess glycol is extracted by vacuum.

24. The method of claim 19, wherein the second intermediate further comprises a butylene isophthalate oligomer, an ethylene isophthalate oligomer, a butylene adipate oligomer, an ethylene adipate oligomer, or a combination thereof, and a terephthalic acid co-tetramethylene glycol ether oligomer, an isophthalic acid co-tetramethylene glycol ether oligomer, an adipic acid co-tetramethylene glycol ether oligomer, or a combination thereof.

* * * * *